United States Patent Office 3,787,528
Patented Jan. 22, 1974

3,787,528
NOVEL FLAME RETARDANT COMPOSITIONS
Isaac Benghiat, Mentor, Ohio, assignor to Universal Oil Products Company, Des Plaines, Ill.
No Drawing. Continuation-in-part of application Ser. No. 888,965, Dec. 29, 1969, now Patent No. 3,691,275, dated Sept. 12, 1972. This application June 5, 1972, Ser. No. 263,357
Int. Cl. C09k 3/28
U.S. Cl. 260—865      9 Claims

ABSTRACT OF THE DISCLOSURE

Novel flame retardant compositions of matter comprising a mixture of a polymer and diester of a polyhalo-substituted alkylphosphonate containing dissimilar halogen atoms as exemplified by polypropylene and dimethyl 3-chloro-2,3-dibromopropylphosphonate will possess useful and desirable physical characteristics of flame retardancy or fire resistance.

CROSS-REFERENCE TO RELATED APPLICATIONS

This application is a continuation-in-part of my copending application Ser. No. 888,965, filed Dec. 29, 1969, now Pat. No. 3,691,275, Sept. 12, 1972.

This invention relates to novel flame retardant compositions of matter comprising a mixture of a polymer and a diester of a polyhalo-substituted alkylphosphonate. More particularly, the invention is concerned with novel flame retardant compositions of matter comprising a mixture of a polymer and an effective concentration of a dialkyl ester of a polyhalo-substituted alkylphosphonate in which said polyhalo substituents constitute at least two dissimilar halogen atoms.

It has now been discovered that the flame retardancy or fire resistance of many compounds such as polymers, resins, etc. may be enhanced by the addition of a diester of a polyhalo-substituted alkylphosphonate, the degree of flame retardancy being further enhanced if the polyhalo substituents in the compound constitute at least two dissimilar halogen atoms. Some examples of compounds which may be admixed with the phosphonate of the type hereinafter set forth in greater detail will include plastics, polymers, resins as well as naturally occurring textiles and fibers, specific examples of these compounds including polyolefins such as polyethylene, polypropylene, polystyrene and copolymers thereof, polyesters, polyurethanes, polyphenyl ethers such as polyphenylene oxides, polycarbonates, polyamides, polyimides, polyoxymethylenes, polyalkylene oxides such as polyethylene oxide, polyacetals, polyacrylates, polymethacrylates, epoxy resins, copolymers or graft polymers of acrylonitrile with styrenic olefins such as acrylonitrile-butadiene-styrene formulations (commonly known as ABS), both naturally occurring and synthetic rubber such as polyisoprene, polybutadiene, EPR rubber, SBR rubber, textiles fibers, fabrics, said textiles, fibers and fabrics being both naturally occurring and synthetic in nature, coatings, paints, varnishes, leathers, foam, etc. By combining these aforementioned compounds with a diester of a polyhalo-substituted alkylphosphonate of the type hereinafter set forth in greater detail, the compounds will possess the desirable physical characteristics of flameproofing or fire retardancy. These particular physical characteristics will possess special advantages when preparing plastics, polymers, resins, various, rubbers, textiles, etc. which will be utilized in places which may be subjected to excessive heat or to the action of a possible flame, such places including architectural panels for construction work, wall plugs for electrical connections, soundproofing material in walls, ceilings, etc., cushions for various vehicle seats such as airplane seats, automobile seats, bus seats, etc.

In addition, the compound when utilized as a constituent of paint, lacquer, varnishes, or protective coatings, films, etc. will also impart a flame resistance to these compounds and, therefore, render them commercially attractive as articles of commerce.

It is therefore an object of this invention to provide novel compositions of matter which possess desirable physical characteristics or properties.

Another object of this invention is to provide a novel composition of matter possessing these desirable physical characteristics of flameproofing and fire retardancy whereby said compositions of matter may be useful as component of finished important commercial articles of manufacture.

In one aspect an embodiment of this invention resides in a novel flame retardant composition of matter comprising a polymer and an effective concentration of a polyhalo-substituted alkylphosphonate possessing the generic formula:

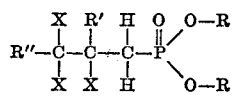

in which X is hydrogen or halogen atoms, at least two X's being halogen, R is an alkyl radical of from 1 to 5 carbon atoms, R' and R" are independently selected from the group consisting of hydrogen, halogen, lower alkyl of from 1 to 5 carbon atoms, cycloalkyl, aryl, aralkyl and alkaryl compounds containing up to 7 carbon atoms and halogenated derivatives thereof, at least two of the halogen atoms being dissimilar in nature.

A specific embodiment of this invention is found in a novel flame retardant composition of matter comprising polypropylene and an effective concentration of dimethyl 3-chloro-2,3-dibromopropylphosphonate.

Other objects and embodiments will be found in the following further detailed description of the present invention.

As hereinbefore set forth the present invention is concerned with novel flame retardant compositions of matter which comprise a mixture of a polymer and a diester of a polyhalo-substituted alkylphosphonate, particularly dialkyl esters of polyhalo-substituted alkylphosphonates in which the halogen substituents comprise at least two dissimilar halogen atoms. The aforementioned diesters of polyhalo-substituted alkylphosphonates will possess the generic formula:

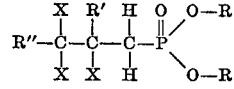

in which X is hydrogen or halogen atoms, at least two X's being halogen, R is an alkyl radical of from 1 to about 5 carbon atoms, R' and R" are independently selected from the group consisting of hydrogen, halogen, lower alkyl of from 1 to 5 carbon atoms, cycloalkyl, aryl, aralkyl and alkaryl compounds containing up to 7 carbon atoms, and halogenated derivatives thereof, at least two of the halogen atoms being dissimilar in nature.

Some representative examples of these diesters which possess the generic formula hereinbefore set forth will include dimethyl 3-chloro-2,3-dibromopropylphosphonate,
dimethyl 4-chloro-2,3-dibromobutylphosphonate,
dimethyl 5-chloro-2,3-dibromopentylphosphonate,
dimethyl 4-chloro-4-cyclohexyl-2,3-dibromobutylphosphonate,
dimethyl 4-chloro-4-phenyl-2,3-dibromobutylphosphonate,
dimethyl 3-chloro-3-(p-tolyl)-2,3-dibromopropylphosphonate, dimethyl 3-chloro-3-benzyl-2,3-dibromopropylphosphonate,
diethyl 3-chloro-2,3-dibromopropylphosphonate,
diethyl 4-chloro-2,3-dibromobutylphosphonate,
diethyl 5-chloro-2,3-dibromopentylphosphonate,
diethyl 4-chloro-4-cyclohexyl-2,3-dibromobutylphosphonate,
diethyl 4-chloro-4-phenyl-2,3-dibromobutylphosphonate,
diethyl 3-chloro-3-(p-tolyl)-2,3-dibromopropylphosphonate,
diethyl 3-chloro-3-benzyl-2,3-dibromopropylphosphonate,
dipropyl 3-chloro-2,3-dibromopropylphosphonate,
dipropyl 4-chloro-2,3-dibromobutylphosphonate,
dipropyl 5-chloro-2,3-dibromopentylphosphonate,
dipropyl 4-chloro-4-cyclohexyl-2,3-dibromobutylphosphonate,
dipropyl 4-chloro-4-phenyl-2,3-dibromobutylphosphonate,
dipropyl 3-chloro-3-(p-tolyl)-2,3-dibromopropylphosphonate,
dipropyl 3-chloro-3-benzyl-2,3-dibromopropylphosphonate,
dibutyl 3-chloro-2,3-dibromopropylphosphonate,
dibutyl 4-chloro-2,3-dibromobutylphosphonate,
dibutyl 5-chloro-2,3-dibromopentylphosphonate,
dibutyl 4-chloro-4-cyclohexyl-2,3-dibromobutylphosphonate,
dibutyl 4-chloro-4-phenyl-2,3-dibromobutylphosphonate,
dibutyl 3-chloro-3-(p-tolyl)-2,3-dibromopropylphosphonate,
dibutyl 3-chloro-3-benzyl-2,3-dibromopropylphosphonate,
dipentyl 3-chloro-2,3-dibromopropylphosphonate,
dipentyl 4-chloro-2,3-dibromobutylphosphonate,
dipentyl 5-chloro-2,3-dibromopentylphosphonate,
dipentyl 4-chloro-4-cyclohexyl-2,3-dibromobutylphosphonate,
dipentyl 4-chloro-4-phenyl 2,3-dibromobutylphosphonate,
dipentyl 3-chloro-3-(p-tolyl)-2,3-dibromopropylphosphonate,
dipentyl 3-chloro-3-benzyl-2,3-dibromopropylphosphonate, etc.

It is to be understood that the aforementioned compounds are only representative of the class of diesters of polyhalo-substituted alkylphosphonates, and that the present invention is not necessarily limited thereto.

The aforementioned diesters of polyhalo-substituted alkylphosphonates may be prepared by reacting a dichloro-substituted alkene with a trialkyl phosphite in the presence of an organic solvent at condensation conditions. These condensation conditions will include a temperature in the range of from about 100° to about 200° C. and preferably at the reflux temperature of the particular solvent if one is employed in the reaction. Generally speaking, the reaction may also be effected at pressures ranging from atmoshperic up to about 50 atmospheres or more, the preferred pressure being atmospheric. Some specific examples of starting materials which may be condensed will include:

1,3-dichloropropene,
2,3-dichloropropene-1,
1,4-dichlorobutene-2,
1,4,4-trichlorobutene-2,
1,5-dichloropentene-2,
1,6-dichlorohexene-2,
1,5,5-trichloropentene-2,
1,6,6-trichlorohexene-2,
1,2,3-trichloropropene,
1,2,4-trichlorobutene-2,
1,2,5-trichloropentene-2,
4-cyclohexyl-1,4-dichlorobutene-2,
4-phenyl-1,4-dichlorobutene-2,
3-(p-tolyl)-dichloropropene-2,
3-benzyl-1,3-dichloropropene-2,
4-benzyl-1,4-dichlorobutene-2,
4-(p-tolyl)-1,4-dichlorobutene-2,
3-cyclohexyl-1,3-dichloropropene-2, etc.

The aforementioned polyhalo-substituted polyalkenes are condensed with alkyl phosphites in which the alkyl substituent may contain from 1 to about 5 carbon atoms. Specific examples of these compounds will include trimethyl phosphite, triethyl phosphite, tripropyl phosphite, triisopropyl phosphite, tributyl phosphite, tri-t-butyl phosphite, triamyl phosphite, tri-sec-amyl phosphite, etc. It is to be understood that the aforementioned specific examples of the polyhalo-substituted alkenes and alkyl phosphites are only representative of the class of compounds which may be used, and that the present invention is not necessarily limited thereto.

The condensation of the two reactants is effected at condensation conditions within the range hereinbefore set forth in the presence of a substantially inert organic solvent. Some specific examples of these organic solvents will include dimethylformamide, diethylformamide, dipropylformamide, dimethylacetamide, diethylacetamide, dipropylacetamide, etc. It is also contemplated that other solvents such as alcohols include methyl alcohol, ethyl alcohol, n-propyl alcohol, isopropyl alcohol, etc.; aromatic solvents such as benzene, toluene, xylenes, ethylbenzene, etc.; paraffinic solvents such as n-heptane, n-hexane, cyclopentane, methylcyclopentane, cyclohexane, etc.; or simple ethers such as dimethyl ether, diethyl ether, dipropyl ether may also be used at elevated pressures if necessary, although not necessarily with equivalent results.

The compound which results from the condensation of the dichloro-substituted alkenes and alkyl phosphite which comprises a chloro-substituted alkenylphosphonate is then subjected to a bromination step by treating said phosphonate with a brominating agent comprising hydrogen bromide or elemental bromine in the presence of an organic solvent at bromination conditions. These bromination conditions will include temperatures ranging from about 0° up to about 150° C., the preferred temperature being at the reflux temperature in the particular solvent which is employed in the reaction and at atmospheric pressure. Upon completion of the addition of the brominating agent, the solvent which is employed is removed by conventional means and the desired product is recovered. Examples of solvents which may be employed in the bromination process will include halo-substituted alkanes such as chloroform and carbon tetrachloride or aromatic solvents such as benzene, chlorobenzene, etc.

The process for preparing the aforementioned diesters of polyhalo-substituted alkylphosphonates may be effected in any siutable manner and may comprise either a batch or continuous type operation. As one example of a method of preparation, when a batch type operation is used, a quantity of the starting materials comprising the polychloro-substituted alkene and the trialkyl phosphite are placed in an appropriate apparatus such as a flask provided with heating, stirring and reflux means. In addition, the flask will also contain the particular solvent which is to be employed. Generally speaking, the reactants are present in the reaction mixture in an equimolar ratio. The reactor is then heated to the desired operating temperature which, as hereinbefore set forth, preferably constitutes the reflux temperature of the particular solvent which is employed in the reaction. The condensation is allowed to proceed at reflux temperature for a predetermined period of time which may range from about 0.5 up to about 10 hours or more in duration, the end of the reaction being attained when there is a cessation of the evolution of alkyl chloride. The reaction mixture is recovered and subjected to fractional distillation whereby the desired product is separated from solvent, unreacted starting materials and/or unwanted side reactions which may have occurred during the condensation period.

The chloro-substituted alkenylphosphonate which constitutes the desired reaction product of the above condensation is then placed in a second reaction vessel also provided with heating or cooling, stirring and reflux means. In addition, the desired solvent of the type hereinbefore set forth is also present in this reactor. Following this the brominating agent is slowly added to the reactor for a predetermined period of time and the reactor is heated to the reflux temperature of the particular solvent. It is contemplated within the scope of this invention that the brominating agent, if in elemental form, may be added as a solution in the same solvent which is present in the reaction vessel. After the addition of the brominating agent has been completed, usually in an equimolar amount of the chloro-substituted alkenylphosphonate which is present in the reactor, the reaction mixture is refluxed for an additional period, the total contact time ranging from 1 to about 10 hours or more in duration, the completion of the reaction being attested to by the disappearance of the bromine color. Upon completion of the bromination reaction, heating is discontinued and the reaction mixture is recovered from the apparatus. This reaction mixture is also subjected to distillation whereby the solvent is separated and the desired product comprising the diester of the polyhalo-substituted phosphonate containing both chlorine and bromine atoms is recovered.

It is also contemplated within the scope of this invention that the preparation of the desired diesters of polyhalo-substituted alkylphosphonates may be accomplished by utilizing a continuous manner of operation, although not necessarily with equivalent results. When such a type of operation is used the starting materials comprising the polychloro-substituted alkene and the trialkyl phosphite are continuously charged to a reaction vessel which is maintained at the proper operating conditions of temperature and pressure. If so desired, the solvent in which the reaction is effected may be admixed with one or both of the starting materials prior to entry into said reactor or, in the alternative, said solvent may be charged to the reactor through a separate line. Upon completion of the desired residence time the reactor effluent is continuously withdrawn and subjected to separation means such as fractional distillation whereby the desired product comprising the chloro-substituted alkenylphosphonate is separated from solvent and unreacted starting materials, the latter two being recycled to form a portion of the feed stock, while the former is charged to a second reaction vessel also maintained at the proper operating conditions of temperature and pressure. In this second reactor the brominating agent, either hydrogen bromide or elemental bromine is also continuously charged at a predetermined rate. In addition, the solvent in which the reaction is effected may be charged to the reactor through a separate line or admixed with the chloro-substituted alkenylphosphonate prior to entry into said recator and the resulting solution charged thereto through a single line. Upon completion of the desired residence time the reactor effluent from the second reactor is continuously discharged and again subjected to conventional separation means such as, for example, fractional distillation whereby the desired diester of the polyhalo-substituted alkylphosphonate containing both chlorine and bromine atoms is recovered while the solvent is recycled back to the second reactor.

While the general method for the synthesis described herein is satisfactory for the preparation of the compounds which comprises the diesters of polyhalo-substituted alkylphosphonates of the present invention, I do not wish to be limited to these preparational procedures, and therefore any other appropriate methods which are known to those skilled in the art may also be utilized to prepare these compounds.

The aforementioned dialkyl esters of polyhalo-substituted alkylphosphonates containing at least two dissimilar halogen atoms are utilized, as hereinbefore set forth, as components in the preparation of novel flame retardant compositions of matter, said diesters of polyhalo-substituted alkylphosphonates being present in an amount of from about 5% to about 50% by weight of the finished product, the other component of the flame retardant composition of matter comprising a polymer. The desired novel compositions of matter which possess flame retardant or fire resistant properties may be prepared in any suitable manner such as, for example, by admixing the compound in a mixer, by milling the components or by extruding the components through a suitable apparatus after admixture thereof, the only criterion being that the two components of the mixture are thoroughly admixed in such a fashion so that the components are uniformly distributed throughout the finished product.

Some representative examples of the novel compositions of matter which possess flame retardant or fire resistant properties will include polypropylene and dimethyl 3-chloro-2,3-dibromopropylphosphonate,
ABS (acrylonitrile-butadiene-styrene) and dimethyl 3-chloro-2,3-dibromopropylphosphonate,
polyethylene oxide and dimethyl 3-chloro-2,3-dibromopropylphosphonate,
polyester and dimethyl 3-chloro-2,3-dibromopropylphosphonate,
polyethylene and dimethyl 3-chloro-2,3-dibromopropylphosphonate,
polyurethane and dimethyl 3-chloro-2,3-dibromopropylphosphonate,
polyphenylene oxide and dimethyl 3-chloro-2,3-dibromopropylphosphonate,
polypropylene and diethyl 3-chloro-2,3-dibromopropylphosphonate,
ABS and diethyl 3-chloro-2,3-dibromopropylphosphonate,
polyethylene oxide and diethyl 3-chloro-2,3-dibromopropylphosphonate,
polyester and diethyl 3-chloro-2,3-dibromopropylphosphonate,
polyethylene and diethyl 3-chloro-2,3-dibromopropylphosphonate,
polyurethane and diethyl 3-chloro-2,3-dibromopropylphosphonate,
polyphenylene oxide and diethyl 3-chloro-2,3-dibromopropylphosphonate,
polypropylene and dimethyl 3-chloro-2,3-dibromobutoxymethylphosphonate,
ABS and dimethyl 3-chloro-2,3-dibromobutoxymethylphosphonate,
polyethylene oxide and dimethyl 3-chloro-2,3-dibromobutoxymethylphosphonate,
polyester and dimethyl 3-chloro-2,3-dibromobutoxymethylphosphonate,
polyethylene and dimethyl 3-chloro-2,3-dibromobutoxymethylphosphonate,
polyurethane and dimethyl 3-chloro-2,3-dibromobutoxymethylphosphonate,
polyphenylene oxide and dimethyl 3-chloro-2,3-dibromobutoxymethylphosphonate,
polypropylene and dipropyl 3-chloro-3-benzyl-2,3-dibromopropylphosphphonate,
ABS and dipropyl 3-chloro-3-benzyl-2,3-dibromopropylphosphonate,
polyethylene oxide and dipropyl 3-chloro-3-benzyl-2,3-dibromopropylphosphonate,
polyester and dipropyl 3-chloro-3-benzyl-1,2,3-dibromopropylphosphonate,
polyethylene and dipropyl 3-chloro-3-benzyl-2,3-dibromopropylphosphonate,
polyurethane and dipropyl 3-chloro-3-benzyl-2,3-dibromopropylphosphonate,
polyphenylene oxide and dipropyl 3-chloro-3-benzyl-2,3-dibromopropylphosphonate, etc.

It is to be understood that the aforementioned compounds which possess flame retardant properties are only representative of the class of compounds which may be prepared, and that the present invention is not necessarily limited thereto.

It is also contemplated within the scope of this invention that the novel flame retardant compositions of matter of the present invention of the type hereinbefore set forth in greater detail, that is, a polymer and a dialkyl ester of a polyhalo-substituted alkylphosphonate may also contain a sufficient amount of a tin and/or antimony compound which will act as a synergist for the flame retardant property of said finished compound by enhancing the desirable characteristic. Some specific examples of the tin and antimony compounds which may be used will include tin compounds in a tetravalent state such as tin dioxide, tin tetrachloride, methyl tin trichloride, ethyl tin trichloride, butyl tin trichloride, dipropyl tin dichloride, trimethyl tin chloride, methyl tin triacetate, dipropyl tin diacetate, diethyl tin dipropionate, diethyl tin dimaleate, dibutyl tin dimaleate, methyl tin trimaleate, dibenzyl tin dichloride, dimethyl tin sulfide, diethyl tin sulfide, dimethyl tin bis(methylmercaptide), dibutyl tin bis(octylmercaptide), diethoxy tin bis(ethylmercaptide), tin tetrakis(methylmercaptide), tin tetrakis(phenylmercaptide), diethyl tin mercaptoacetate, dioctyl tin mercaptoacetate, dihexyl tin mercaptopropionate, dimethyl tin mercaptobutyrate, dioctyl tin mercaptobutyrate, dilauryl tin dithiobutyric acid ethyl ester, diethyl tin S,S'-bis(3,5,5-trimethylhexyl mercaptoacetate), dibutyl tin S,S'-bis(phenoxyethyl mercaptoacetate), dibutyl tin S,S'-bis(diethylene glycol laurate mercaptoacetate), etc., antimony trioxide, antimony oxychloride, etc. It is to be understood that these compounds are only representative of the synergistic additives which may be admixed with the polymer and the phosphonate, and that the present invention is not necessarily limited thereto.

As will be hereinafter shown in the specific examples, the novel compositions of matter of the present invention comprising a mixture of a polymer and a diester of a polyhalo-substituted alkylphosphonate which contains dissimilar halogen atoms as substituents thereof will possess an unexpectedly high degree of fire retardancy as compared to polymers which do not possess all of the components hereinafter claimed.

The following examples are given to illustrate the novel compositions of matter of the present invention which, however, are not intended to limit the generally broad scope of the present invention in strict accordance therewith.

EXAMPLE I

In this example one component of the novel flame retardant composition of matter of the present invention was prepared by placing 66.6 g. (0.6 mole) of 1,3-dichloropropene, 74.4 g. (0.6 mole) of trimethyl phosphite and 7.7 g. of dimethylformamide in a flask provided with heating, stirring and refluxing means. The mixture was heated to reflux and maintained thereat for a period of 6.5 hours, the temperature of the mixture rising from 122° to 165° C. during this period. When the evolution of methyl chloride ceased, heating was discontinued and the mixture allowed to return to room temperature. The reaction mixture was recovered and subjected to fractional distillation, the fraction boiling at 114° to 118° C. at 8 mm. pressure comprising dimethyl 3-chloroallylphosphonate being recovered.

A solution of 60 cc. of carbon tetrachloride and 36.9 g. (0.2 mole) of dimethyl 3-chloroallylpohsphonate which was prepared according to the process of the above paragraph was placed in a flask similar to that used in paragraph one above and heated to reflux (about 77° C.). To this refluxing solution was added a solution of 32 g. (0.2 mole) of elemental bromine in 40 cc. of carbon tetrachloride, said bromine being added dropwise during a period of about 90 minutes. Upon completion of the addition of the bromine the reaction mixture was refluxed for a period of about 5 hours until the bromine color had disappeared. The solution was then subjected to fractional distillation under reduced pressure whereby the carbon tetrachloride solvent was removed. The remaining product comprised dimethyl 3-chloro-2,3-dibromopropylphosphonate. An elemental analysis was effected with the following results. Calculated for $C_5H_{10}Br_2ClO_3P$: Cl, 10.3%. Found: Cl, 10.5%.

EXAMPLE II

In this example an equimolar mixture of 66.6 g. (0.6 mole) of 1,3-dichloropropene and 99.6 g. (0.6 mole) of triethyl prosphite along with 8 g. of dimethylformamide is placed in a flask similar to that used in the above experiment. The flask is heated to reflux temperature and maintained thereat for a period of about 7 hours until the evolution of ethyl chloride ceases. The mixture is then subjected to fractional distillation under reduced pressure and the desired product comprising diethyl 3-chloroallylphosphonate is separated out and recovered.

A solution of 42.5 g. (0.2 mole) of diethyl 3-chloroallylphosphonate which is prepared according to the above paragraph in 60 cc. of carbon tetrachloride is heated to reflux in an apparatus comprising a flask provided with heating, stirring and reflux means. Thereafter a solution of 32 g. (0.2 mole) of elemental bromine in 40 cc. of carbon tetrachloride is slowly added dropwise to this refluxing solution. Upon completion of the addition the resulting mixture is refluxed for a period of about 5 hours until the bromine color has disappeared. Upon completion of the desired residence time the mixture is subjected to fractional distillation under reduced pressure in order to remove the carbon tetrachloride solvent, the desired product comprising diethyl 3-chloro-2,3-dibromopropylphosphonate being recovered therefrom.

EXAMPLE III

An equimolar mixture of 75 g. (0.6 mole) of 1,4-dichlorobutene-2 and 74.4 g. (0.6 mole) of trimethyl phosphite along with 10 g. of diethylformamide is heated at reflux until the evolution of methyl chloride is practically ceased, the temperature rising during the reflux period which extends over a period of 6.5 hours. At the end of this time the solution is subjected to fractional distillation under reduced pressure and the desired dimethyl 4-chlorobutenylphosphonate is recovered therefrom.

To a solution maintained at reflux temperature comprising 39.7 g. (0.2 mole) of dimethyl 4-chlorobutenylphosphonate in 60 cc. of carbon tetrachloride is slowly added a solution of 32 g. (0.2 mole) of elemental bromine in 40 cc. of carbon tetrachloride, said addition being effected dropwise during a period of about 90 minutes. Upon completion of the addition, the solution is refluxed for an additional period of 5 hours until the bromine color has disappeared. The solution is then subjected to fractional distillation under reduced pressure to remove the carbon tetrachloride, the remainder being the desired product comprising dimethyl 4-chloro-2,3-dibromobutylphosphonate.

EXAMPLE IV

The reaction set forth in Example III above is repeated, the difference being the use of 99.6 g. (0.6 mole) of triethyl phosphite in place of the 74.4 g. of trimethyl phosphite which is reacted with 1,4-dichlorobutene-2. The desired product which is recovered by fractional distillation comprises diethyl 4-chlorobutenylphosphonate. This product is then treated with elemental bromine in a manner similar to that hereinbefore set forth whereby, after fractional distillation under reduced pressure to remove the carbon tetrachloride solvent, the desired product comprising diethyl 4-chloro-2,3-dibromobutylphosphonate is recovered.

EXAMPLE V

To illustrate the flame retardant properties of the novel compositions of matter of the present invention a polyester was prepared in a conventional manner by admixing 1 mole of maleic anhydride, 1 mole of phthalic anhydride and 2 moles of propylene glycol to a final temperature of 195° C. The resultant ester was mixed with styrene following which the ester was divided into two portions. To one portion of the polyester was added a sufficient amount of the compound prepared according to Example I above, that is, dimethyl 3-chloro-2,3-dibromopropylphosphonate so that the finished compound contained 15 parts per hundred of the phosphonate per hundred parts of resin. The untreated polyester was labeled A while the treated polyester was labeled B. The two esters were then treated with a catalyst and poured into molds. Following this, the casts were cured in an air oven. The casts were burned in an apparatus similar to that described by C. P. Fennimore and J. F. Martin in the November, 1966 issue of Modern Plastics. The cast which contained only the polyester (A) had an oxygen index (the lowest mole fraction of oxygen sufficient to maintain combustion) of $n=0.187$. In contrast to this, the oxygen index of the polyester cast which contained the dimethyl 3-chloro-2,3-dibromopropylphosphonate (B) had an oxygen index of 0.239. Inasmuch as the oxygen index of air is 0.21, it should be noted that the polyester containing the phosphonate would not support combustion in an ordinary environment and that a higher concentration of oxygen would have to be present in order that combustion of this composition of matter would occur.

EXAMPLE VI

In this example a novel flame retardant composition of matter of the present invention is prepared by milling commercial polypropylene with dimethyl 3-chloro-2,3-dibromopropylphosphonate which is prepared according to the process set forth in Example I above so that the finished product will contain 15% by weight of the phosphonate. Thereafter the resulting compound is formed into a strip which will contain a glass cloth in the center thereof to prevent dripping during the combustion test. A second strip consisting of only polypropylene is also prepared and thereafter both strips are subjected to a flammability test similar to that set forth in Example I above. The oxygen index of the strip which contains only polypropylene will be 0.181 while the strip which comprises polypropylene and the phosphonate compound will exhibit a burning rate which is far slower than the strip which contains no flame retardant, and, in addition will possess a greater than average oxygen index.

EXAMPLE VII

To illustrate the flame retardant properties of the novel compositions of matter of the present invention a commercial polyethylene oxide is milled and cut into a strip similar in nature to the polypropylene strip which was prepared in Example VI above. Another sample is prepared by admixing polyethylene oxide and dimethyl 4-chloro-3,4-dibromobutylphosphonate in sufficient amounts so that the finished polymer will contain 15% of the phosphonate compound. The untreated and treated strips of polyethylene oxide are also subjected to a flammability test utilizing an apparatus similar to that set forth in Example V above. The oxygen index of the untreated polyethylene oxide is 0.150 while the oxygen index of the compound of the present invention will be substantially in excess of this number and, in addition, will have a much slower burning rate than that of the untreated polyethylene oxide.

EXAMPLE VIII

As an example of the flame retardant properties of the compositions of matter of the present invention a commercial ABS (acrylonitrile-butadiene-styrene) formulation is admixed with dimethyl 3-chloro-2,3-dibromopropylphosphonate, the finished product containing 15% by weight of the phosphonate compound. This mixture is extruded as rods having a diameter of 0.5 cm. In addition, another rod of similar diameter is prepared which contains only the commercial ABS formulation. Following this the rods are burned in a flammability test utilizing an apparatus which is similar in nature to that referred to in Example V above. The rod which contains only the commercial ABS formulation will have an oxygen index of 0.183 while, in contrast to this, the oxygen index of the ABS formulation containing the phosphonate will be greatly in excess of this number.

EXAMPLE IX

A novel flame retardant composition of matter of the present invention is prepared by milling a commercial polyethylene formulation with diethyl 3 - chloro-2,3-dibromopropylphosphonate in sufficient quantities so that the finished formulation will contain about 16% by weight of the finished compound. The thus formed polymer is cut into strips which contain a glass cloth in the center of the strip to prevent dripping during combustion. In addition, commercial polyethylene, per se, is milled and also cut into strips of similar configuration. The two strips are then subjected to a flammability test similar in nature to that described in Example V above. The results of these tests will show that the oxygen index of the polymer containing the phosphonate will be in excess over the oxygen index of the untreated polyethylene. Additionally, it will also be found that the rate of burning of the treated polyethylene will be much slower than that which is exhibited by the untreated polyethylene.

I claim as my invention:

1. A flame retardant composition of matter comprising a polymer and an effective concentration of a polyhalo-subtsituted alkylphosphonate possessing the generic formula:

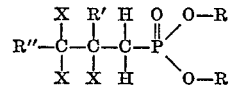

in which X is hydrogen, chlorine or bromine atoms, at least two X's being halogen, R is an alkyl radical of from 1 to about 5 carbon atoms, R' and R" are independently selected from the group consisting of hydrogen, chlorine, bromine, lower alkyl of from 1 to 5 carbon atoms, cycloalkyl, aryl, aralkyl and alkaryl compounds containing up to 7 carbon atoms and chlorinated and brominated derivatives thereof, at least two of the halogen atoms being dissimilar in nature.

2. The composition of matter as set forth in claim 1 in which said diester of a polyhalo-substituted alkylphosphonate is present in an amount of from 5% to about 50% by weight of the finished composition of matter.

3. The composition of matter as set forth in claim 1 in which said polymer is a cured maleic anhydride polyester and said diester of a polyhalo-substituted alkylphosphonate is dimethyl 3-chloro-2,3-dibromopropylphosphonate.

4. The composition of matter as set forth in claim 1 in which said polymer is polyethylene and said diester of a polyhalo-substituted alkylphosphonate is diethyl 3-chloro-2,3-dibromopropylphosphonate.

5. The composition of matter as set forth in claim 1 in which said polymer is an acrylonitrile-butadiene-styrene formulation and said diester of a polyhalo-substituted alkylphosphonate is dimethyl 3 - chloro-2,3-dibromopropylphosphonate.

6. The composition of matter as set forth in claim 1 in which said polymer is a polyethylene oxide and said diester of a polyhalo-substituted alkylphosphonate is dimethyl 4-chloro-2,3-dibromobutylphosphonate.

7. The composition of matter as set forth in claim 1 in which said polymer is polypropylene and said diester of a polyhalo-substituted alkylphosphonate is dimethyl 3-chloro-2,3-dibromopropylphosphonate.

8. The composition of claim 1 further characterized in that said polymer is a polyolefin.

9. The composition of claim 1 further characterized in that said polymer is selected from the group consisting of a cured maleic anhydride polyester, polyethylene, an acrylonitrile-butadiene-styrene formulation, polyethylene oxide and polypropylene.

References Cited

UNITED STATES PATENTS

| | | | |
|---|---|---|---|
| 2,877,204 | 3/1959 | Duhnkrack et al. | 260—870 |
| 3,046,236 | 7/1962 | Jahn | 260—2.5 |
| 3,250,827 | 5/1966 | Schroll | 260—961 |
| 3,325,563 | 6/1967 | Taylor et al. | 260—921 |
| 3,530,083 | 9/1970 | Hindersinn et al. | 260—28 |

DONALD E. CZAJA, Primary Examiner

R. A. WHITE, Assistant Examiner

U.S. Cl. X.R.

260—45.7 P, 880 R